United States Patent [19]

Schmidt

[11] 4,192,480

[45] Mar. 11, 1980

[54] FOLDING STAND FOR BASSINET OR THE LIKE

[76] Inventor: Theodore F. Schmidt, 1223 N. Main St., Wheaton, Ill. 60187

[21] Appl. No.: 937,064

[22] Filed: Aug. 28, 1978

[51] Int. Cl.² ............................................ F16M 11/38
[52] U.S. Cl. .................................... 248/436; 108/113; 248/188.6
[58] Field of Search ............ 248/167, 172, 173, 188.6, 248/148, 150, 151, 237, 188.7, 166, 439, 436; 108/113; 211/132

[56] References Cited

U.S. PATENT DOCUMENTS

| | | | |
|---|---|---|---|
| 478,065 | 6/1892 | Miller | 248/439 |
| 573,756 | 12/1896 | Bergstresser | 248/166 X |
| 1,692,704 | 11/1928 | Rohrig | 248/150 X |
| 1,890,710 | 12/1932 | Williams | 108/113 |
| 2,652,930 | 9/1953 | Christenson | 211/132 X |
| 2,720,437 | 10/1955 | Baxter | 211/132 X |
| 2,879,120 | 3/1959 | Hoine et al. | 108/113 |
| 3,112,954 | 12/1963 | Kanitz | 108/113 X |
| 3,144,841 | 8/1964 | Meringoff | 108/113 X |
| 3,511,532 | 5/1970 | Tringali et al. | 108/113 X |
| 3,715,143 | 2/1973 | Gerken | 108/113 X |

Primary Examiner—J. Franklin Foss
Attorney, Agent, or Firm—Darbo & Vandenburgh

[57] ABSTRACT

A foldable stand for a bassinet or the like has four upright legs in a rectangular configuration when unfolded. At each end of the stand, the legs are rigidly interconnected by a horizontal bar supporting the corresponding end of the bassinet. Above the support bars at opposite ends of the stand, opposed U-shaped guard rails are pivotally mounted to the tops of the legs such that when deployed the guard rails bracket the lower ends of the bassinet. A diagonal cross brace is pivotally connected at one end to a point near the bottom of each leg and at the other end to the end of the U-shaped guard rail which is connected to the top of the corresponding leg on the same side of the stand. There are four such cross braces, two of which crisscross on each side of the stand and are pivotally interconnected like scissors so that the two end pairs of legs can be collapsed toward each other while remaining parallel as the cross braces close and the guard rails tip upright. Stops are located on the cross braces to lock the stand when the guard rails are horizontal.

10 Claims, 7 Drawing Figures

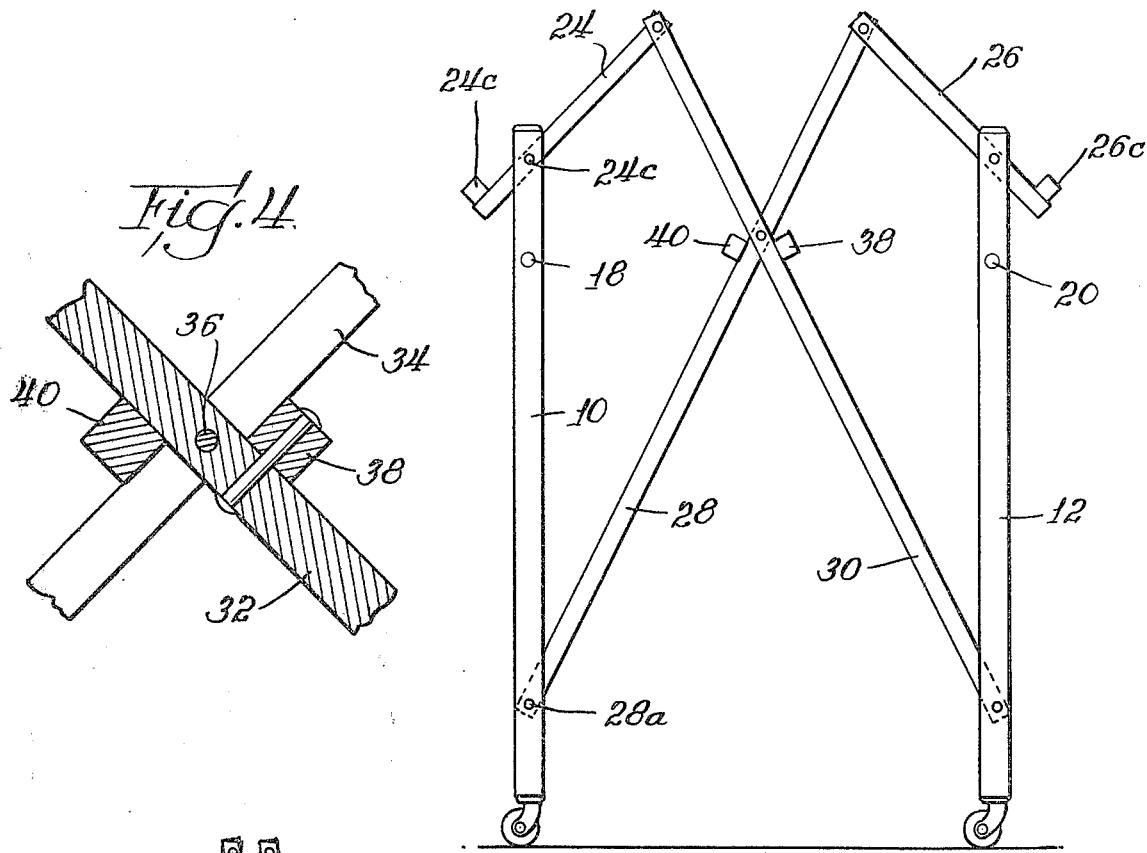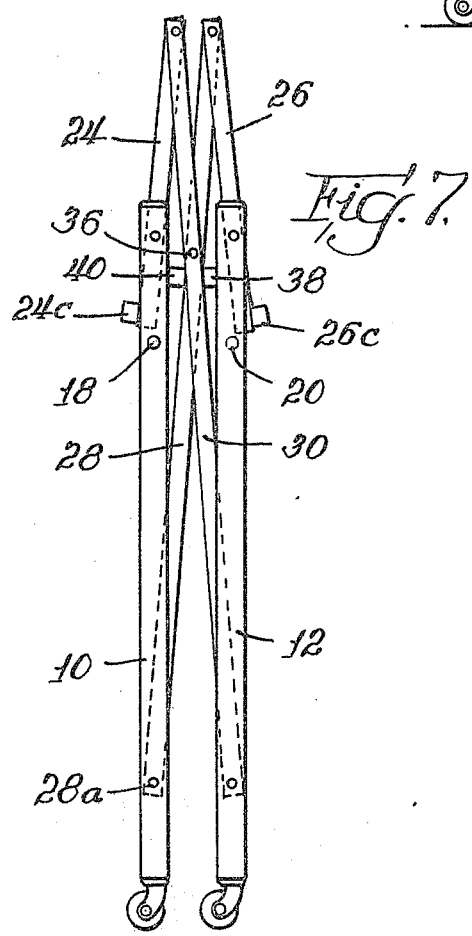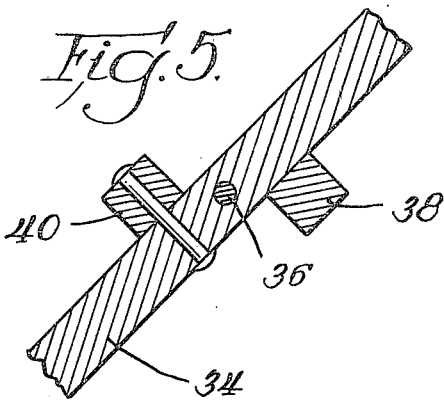

//FOLDING STAND FOR BASSINET OR THE LIKE

BACKGROUND AND SUMMARY OF THE INVENTION

The invention relates generally to the art of foldable legs, supports, bases and stands for tables and the like. It has as its general purpose the provision of a sturdy light-weight, easily manufactured, compact, collapsing base for a bassinet or the like which is capable of being assembled solely from precut, predrilled wooden bars and dowel rods glued or riveted together without any other hardware.

BRIEF DESCRIPTION OF THE DRAWING

FIGS. 4 and 5, respectively, are detail sectional views taken along lines 4—4 and 5—5 of FIG. 3 showing the locking interaction between the stops and cross braces on one side of the stand;

FIGS. 6 and 7 are side elevations of the stand of FIGS. 1-3 in stages of intermediate and full collapse, respectively.

DESCRIPTION OF SPECIFIC EMBODIMENT

Figure 1:
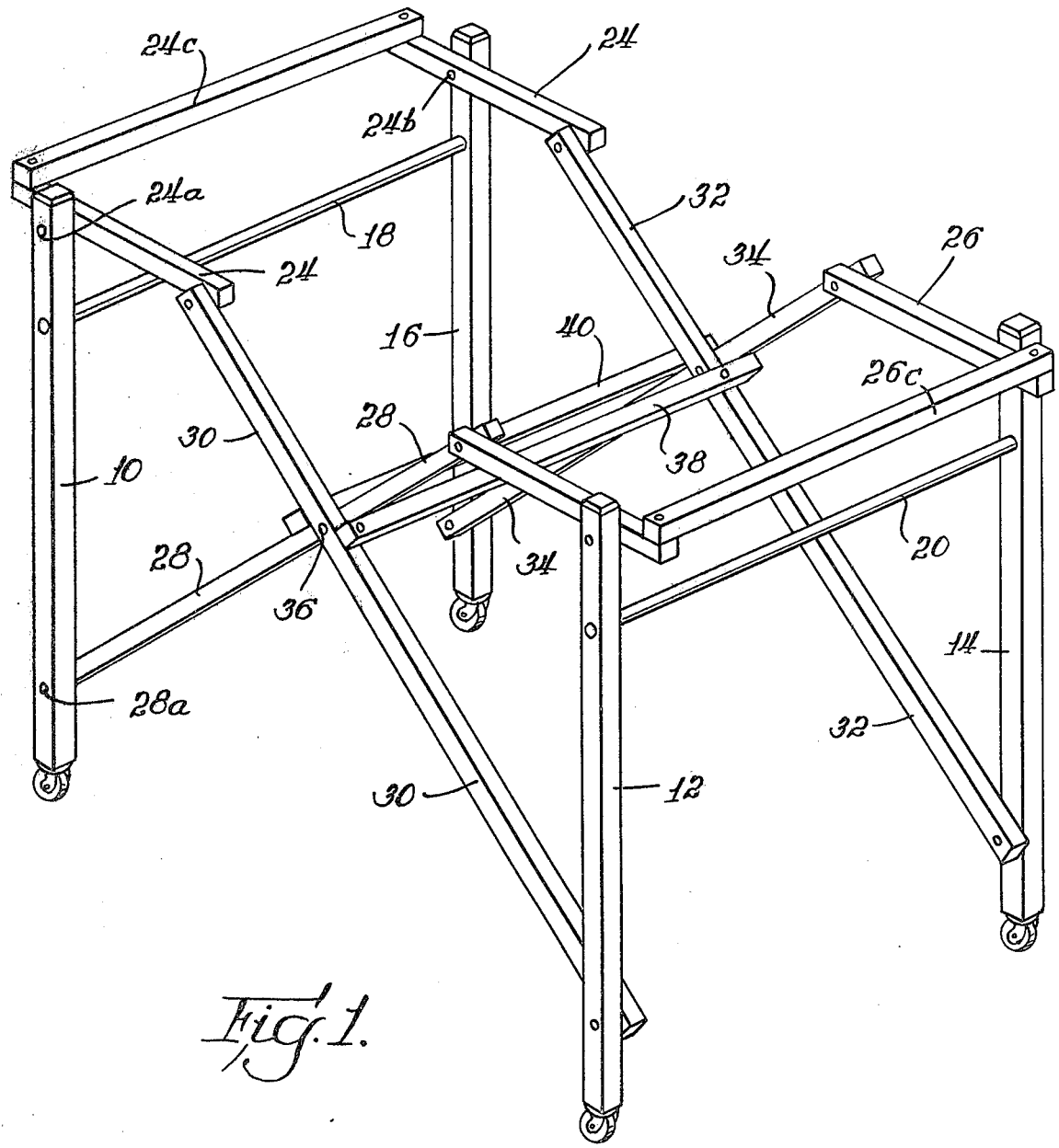
FIG. 1 is an isometric view of the stand according to the invention.
Figure 2:
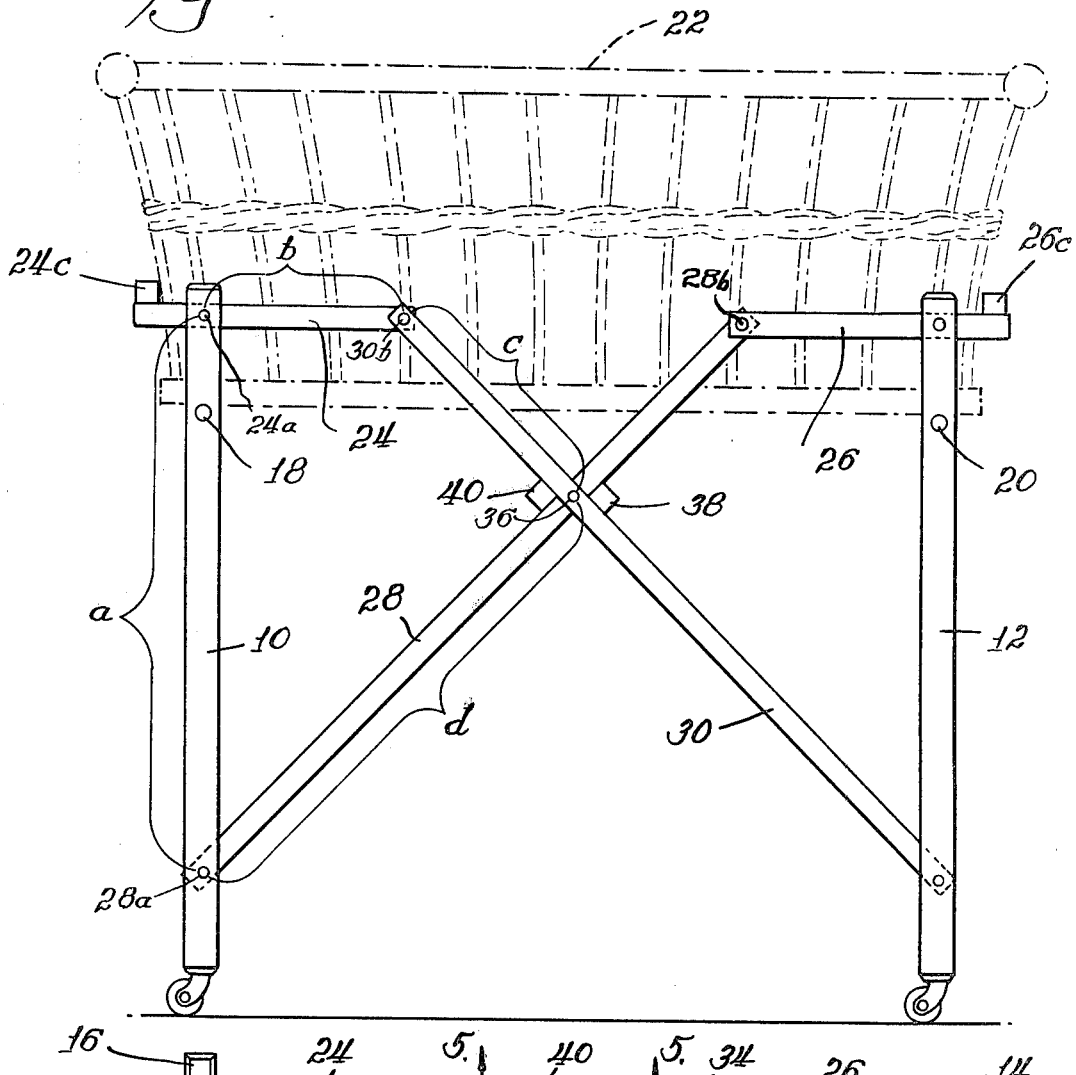
FIG. 2 is a side elevation showing the stand of FIG. 1 with the bassinet in place in phantom.
Figure 3:
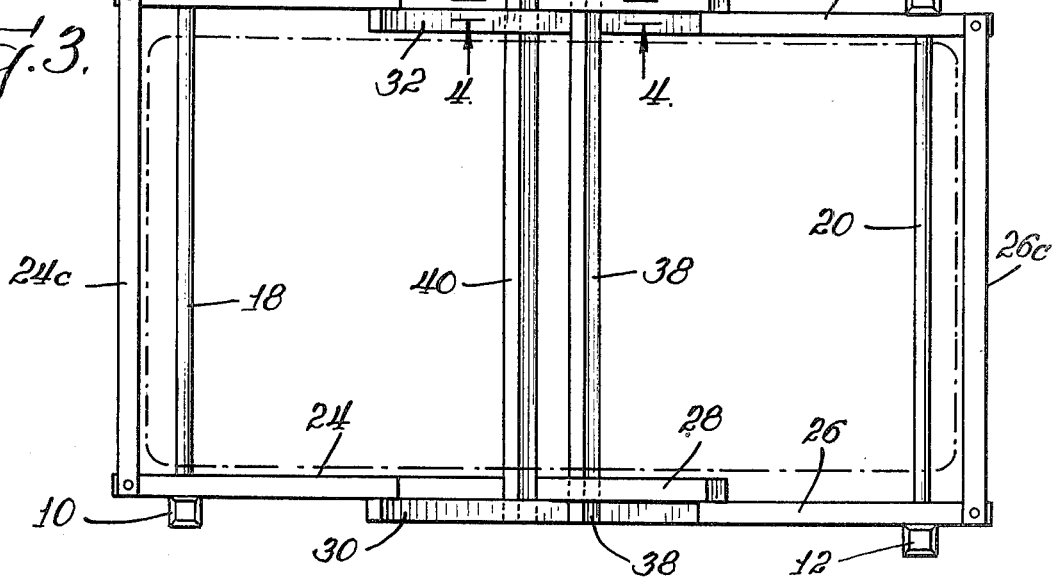
FIG. 3 is a plan view showing the stand of FIG. 2 with the base of the bassinet in phantom.

A folding stand or base constructed according to the invention is shown in the completely unfolded condition in FIGS. 1-3. Preferably, the stand is made entirely of wooden dowels and bars with square cross sections of two sizes, glued or riveted together, requiring no other hardware. The stand has four identical upright parallel legs 10, 12, 14 and 16, for which the larger cross section bars are preferred; all of the other bars may be of smaller cross section. If desired, the lower ends of the legs may be equipped with casters as shown. The legs are arranged in a generally rectangular configuration when unfolded, defining two end pairs of legs (10, 16 and 12, 14) rigidly interconnected by a horizontal support bar 18, 20 made of dowel rod glued into corresponding holes in the legs to provide rigid support in all directions. The end of the bassinet 22 rests on the bars 18 and 20 to support the bassinet. Above the support bar 18 a U-shaped guard rail 24 is pivotally mounted with rivets 24a and 24b to legs 10 and 16 so that the open end of the guard rail 24 is inward. The closed end of the guard rail 24 is formed by a bar 24c riveted to the outer ends of the parallel portions of the guard rail 24. The end rail 24c is preferably mounted above the parallel portions of the guard rail so as to engage the bassinet 22 at a higher point. Placing the end rail 24c in the opposite fashion (not shown) underneath the parallel portions of the guard rail makes the collapsed unit (FIG. 7) somewhat more compact. An identical guard rail 26 is pivotally connected in the same manner to legs 12 and 14 at the other end of the stand such that when deployed horizontally, the two opposed guard rails 24 and 26 bracket the bassinet 22. The two end rails 24c and 26c also serve as handles by which to unfold or fold up the bassinet stand.

Four equal length diagonal cross braces 28, 30, 32 and 34 made of wooden bars interconnect the inner ends of the U-shaped guard rails 24 and 26 with the upright legs 10, 12, 14 and 16. Brace 28 is pivotally riveted to the inside of leg 10 and at the other end is pivotally riveted to the end of the U-shaped guard rail 26 which is connected to the top of the corresponding leg 12 on the same side of the stand. The second cross brace 30 has one end pivotally riveted to the inside of leg 12 and has its other end pivotally riveted to the end of the guard rail 24 which is connected to the top of leg 10. The two braces 28 and 30 thus crisscross on one side of the stand and are pivotally interconnected with another rivet 36 like scissors. On the other side of the stand, the other two cross braces 32 and 34 are similarly interconnected between leg 14 and the other end of U-shaped rail 24 and leg 16 and the other end of U-shaped rail 26, respectively, and are pivotally riveted together as well so that the end pairs of legs can be collapsed inwardly toward each other while remaining parallel.

On the upper surface of each diagonal brace just below the pivotal interconnection at 36, for example, a pair of stop bars 38 and 40 are riveted horizontally across braces 30 and 32, and 28 and 34, respectively. The positioning of these stop bars is such that when the stand is unfolded to the point where the U-shaped guard rails are horizontal, diagonal braces 28 and 34 come to rest squarely upon stop bar 38, while diagonal braces 30 and 32 likewise come to rest squarely upon stop bar 40, as shown particularly in FIGS. 4 and 5. The bars 38 and 40 also add stability to the structure but are not required for supporting the bassinet 22.

To collapse the stand after removing the bassinet, one grasps the end rails 24c and 26c and urges them gently together whereupon the diagonal cross braces 28, 30 and 32, 34 begin to scissor together partially collapsing the stand as shown in FIG. 6. Ultimately, continuing to urge the end rails together collapses the stand fully, as shown in FIG. 7.

It is notable that the legs are always parallel in FIGS. 2, 6 and 7, showing the stand unfolded, partially collapsed and fully collapsed, respectively. In addition, the length of any upright leg, for example, leg 10 between pivot points 28a and 24a (designated a in FIG. 2), added to the length b of the end portion of the U-shaped guard rail 24 between pivot points 24a and 30b, should be equal to the length c of the diagonal cross brace 30 between pivot point 36 and 30b, plus the length d of the other diagonal brace 28 between pivot points 28a and 36; that is, a+b equals c+d so that complete folding is possible. Actually, because of the equal lengths and symmetry of the geometry of the cross braces, c+d equals the length of the cross brace between the pivots 28a and 28b. In the preferred embodiment, the diagonal cross braces make 45° angles with the vertical legs when unfolded. It is also advantageous that the height at which the bassinet is supported is solely determined by the location of the support bar (18, 20) and the length of the upright legs of the stand which can be lengthened without interfering with the folding of the collapsible apparatus.

It will be understood from the foregoing that the folding stand consists of a pair of identical folding frameworks spaced apart and rigidly held together by the rods 18, 20 and further connected together by end rails 24c, 26c and stop bars 38, 40. The rectilinear stop bars, in engagement with the cross braces 28, 30 when the stand is fully unfolded as shown in detail in FIGS. 4 and 5 provide important support, enhancing the rigidity of the structure.

It will also be understood that the stand may be designed to provide support at any predetermined height by shortening or lengthening the portions of the legs below the brace pivotal connections. Indeed, a particular stand can be made adjustable as to height by providing length-adjustable structures at the bottom ends of the legs. Thus, the height of a bassinet supported by the stand can be made adjustable to be most convenient and comfortable to the mother or other person attending a baby in the bassinet.

I claim:

1. A folding framework, comprising in a single general plane:
   a pair of spaced parallel legs;
   a pair of bars articulated respectively from corresponding ends of the respective legs so as to be pivotable inwardly toward each other;
   a pair of diagonal intersecting braces, each pivotally connected at opposite ends to the inner end of the respective bar and the opposite leg, said braces being pivotally interconnected where they intersect, said braces making approximately 45° angles with said legs and approximately 90° with each other when said framework is fully unfolded, and
   stop means for firmly stopping and holding the framework in its fully unfolded position in which said bars are approximately aligned at right angles to said legs, said stop means comprising a pair of stops square in cross section and affixed respectively upon respective braces to engage the other brace.

2. The folding framework of claim 1, wherein the sum of the distance between the points of intersection of one of said legs with its associated brace and with its articulated bar (length a) and the distance between the points of intersection of said bar with said leg and with the other brace (length b is approximately equal to the sum of the distance between the points of intersection of said other brace with said bar and with said one brace (length c) and the distance between the point of interconnection of said one brace with said other brace and the point of intersection of said one leg with said other brace (length d).

3. The folding stand of claim 1, further comprising means connected to said legs for supporting a removable object.

4. A folding stand comprising:
   two pairs of substantially parallel spaced apart legs;
   a pair of framework members in accordance with claim 1 articulated from corresponding ends of the respective pairs of legs so as to be pivotable inwardly toward each other and means for rigidly connecting said framework members in spaced parallel relationship to each other.

5. The folding stand of claim 4, wherein said stop means includes first and second horizontal stop bars, each rigidly connected across two parallel ones of said braces on opposite sides of the stand, said bars being positioned to lock the stand in the fully unfolded position.

6. The folding stand of claim 4, wherein the opposite bars of each framework member are connected at their outer ends to form a U-shaped frame member such that said frame members together form a bracket-like enclosure when the stand is unfolded.

7. The folding stand of claim 6, wherein said braces, frame members and stop bars are all made of wooden bars of the same rectangular cross section.

8. The folding stand of claim 6, wherein rivets form all of the interconnections between said legs, braces, frame members and stop bars.

9. The stand of claim 5, wherein the means for connecting said framework members comprise a pair of support rods interconnecting the opposite legs of each pair of framework members at a level higher than the stop bars for supporting a removable object within the enclosure formed by said frames.

10. The folding stand of claim 9 wherein said support rods are made of dowel rod whose ends are received in matching bores in the legs for added rigidity.

* * * * *